United States Patent
Bishop et al.

(10) Patent No.: US 11,143,054 B2
(45) Date of Patent: Oct. 12, 2021

(54) TIP CLEARANCE RADIO FREQUENCY SENSOR

(71) Applicant: Rolls-Royce Corporation, Indianapolis, IN (US)

(72) Inventors: Glen Steven Bishop, Indianapolis, IN (US); Wayne Thomas Padgett, Sr., Terre Haute, IN (US); John Joseph Costello, Indianapolis, IN (US); Geoffrey L. Gatton, Brownsburg, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 268 days.

(21) Appl. No.: 16/373,563

(22) Filed: Apr. 2, 2019

(65) Prior Publication Data

US 2020/0157967 A1    May 21, 2020

Related U.S. Application Data

(60) Provisional application No. 62/769,369, filed on Nov. 19, 2018.

(51) Int. Cl.
  *F01D 21/00* (2006.01)
  *G01B 7/14* (2006.01)
  (Continued)

(52) U.S. Cl.
  CPC ............ *F01D 21/003* (2013.01); *G01B 7/14* (2013.01); *G01N 17/006* (2013.01); *G01P 3/44* (2013.01); *F05D 2220/32* (2013.01)

(58) Field of Classification Search
  CPC .......... F01D 21/003; F01D 5/20; F01D 17/02; F01D 11/14; G01B 7/14; G01N 17/006;
  (Continued)

(56) References Cited

U.S. PATENT DOCUMENTS

| 4,804,905 A | 2/1989 | Ding et al. |
| 4,818,948 A | 4/1989 | Dooley |

(Continued)

FOREIGN PATENT DOCUMENTS

| EP | 1 314 957 A2 | 5/2003 |
| EP | 1 918 679 A2 | 5/2008 |

(Continued)

OTHER PUBLICATIONS

Scott B. Lattime et al., "Turbine Engine Clearance Control Systems: Current Practices and Future Directions," dated Sep. 2002, pp. 1-22, published online by National Aeronautics and Space Administration, Washington, DC.

(Continued)

*Primary Examiner* — Christopher P McAndrew
*Assistant Examiner* — Zannatul Ferdous
(74) *Attorney, Agent, or Firm* — Crowell & Moring

(57) ABSTRACT

A blade tip sensor may be provided that includes a bridge-network circuit embedded in a composite body such as a ceramic matrix composite body. The bridge-network circuit may include a first resistor-capacitor circuit on a first branch and a second resistor-capacitor circuit on a second branch. Each of the first resistor-capacitor circuit and the second resistor-capacitor circuit includes a corresponding capacitor having a capacitance that depends on a distance between the corresponding capacitor and a blade of a rotor.

16 Claims, 8 Drawing Sheets

(51) Int. Cl.
*G01P 3/44* (2006.01)
*G01N 17/00* (2006.01)

(58) Field of Classification Search
CPC .... G01P 3/44; F05D 2220/32; F05D 2240/11; F05D 2260/80; F05D 2270/80; F05D 2270/821; F05D 2300/603; F05D 2300/6032; F05D 2300/6033; Y02T 50/60
See application file for complete search history.

(56) References Cited

U.S. PATENT DOCUMENTS

| | | |
|---|---|---|
| 7,455,495 B2 | 11/2008 | Leogrande et al. |
| 2005/0158511 A1 | 7/2005 | Sabol et al. |
| 2006/0056960 A1 | 3/2006 | Sabol et al. |
| 2011/0260741 A1* | 10/2011 | Weaver .................... C23F 1/02 324/686 |
| 2013/0068024 A1 | 3/2013 | Xu et al. |
| 2015/0323301 A1* | 11/2015 | Zhe .......................... G01B 7/14 324/207.15 |
| 2017/0057879 A1* | 3/2017 | Harris ............... C04B 35/62863 |
| 2017/0059159 A1* | 3/2017 | Varney .................... C04B 41/81 |
| 2017/0313627 A1* | 11/2017 | Shim ..................... C04B 35/584 |
| 2019/0104723 A1* | 4/2019 | Vecchi .................. A01M 17/00 |

FOREIGN PATENT DOCUMENTS

| | | |
|---|---|---|
| EP | 2 551 451 A1 | 1/2013 |
| EP | 2 169 345 B1 | 10/2015 |
| GB | 2 071 852 A1 | 9/1981 |
| GB | 2 314 631 A | 1/1998 |

OTHER PUBLICATIONS

Extended European Search Report, issued in European Application No. 19204272.9, dated Apr. 14, 2020, pp. 1-7, European Patent Office, Munich, Germany.

* cited by examiner

TIP CLEARANCE RADIO FREQUENCY SENSOR

CROSS-REFERENCE TO RELATED APPLICATIONS

This application is a non-provisional application of U.S. provisional application 62/769,369, filed Nov. 19, 2018, which is hereby incorporated by reference.

TECHNICAL FIELD

This disclosure relates to sensors and, in particular, to blade tip sensors.

BACKGROUND

Present blade tip sensors suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a radio frequency sensor is provided comprising a composite body and a resistor-capacitor circuit embedded in the composite body. The composite body may be, for example, a ceramic matrix composite (CMC) body such as a CMC engine shroud. A portion of the composite body forms a dielectric of a capacitor of the resistor-capacitor circuit, and the capacitor has a capacitance that depends on a distance between the capacitor and a blade of a rotor of gas turbine engine.

In another example, a blade tip sensor is provided comprising a bridge-network circuit included in a composite body. The bridge-network circuit comprises a first resistor-capacitor circuit on a first branch and a second resistor-capacitor circuit on a second branch. Each of the first resistor-capacitor circuit and the second resistor-capacitor circuit includes a corresponding capacitor having a capacitance that depends on a distance between the corresponding capacitor and a blade of a rotor.

In still another example, a method to form a blade tip sensor is provided. Ceramic fibers are arranged in in layers to form a porous ceramic preform. The ceramic preform is formed into a ceramic matrix composite body by melt and/or vapor infiltration. At least one of the ceramic fibers is part of a capacitor of a bridge-network circuit embedded in the ceramic matrix composite body. The bridge-network circuit comprises a first resistor-capacitor circuit on a first branch and a second resistor-capacitor circuit on a second branch. The capacitor is included in the first resistor-capacitor circuit or the second resistor-capacitor circuit. The capacitor has a capacitance that depends on a distance between the capacitor and a blade of a rotor of gas turbine engine.

Figure 1:
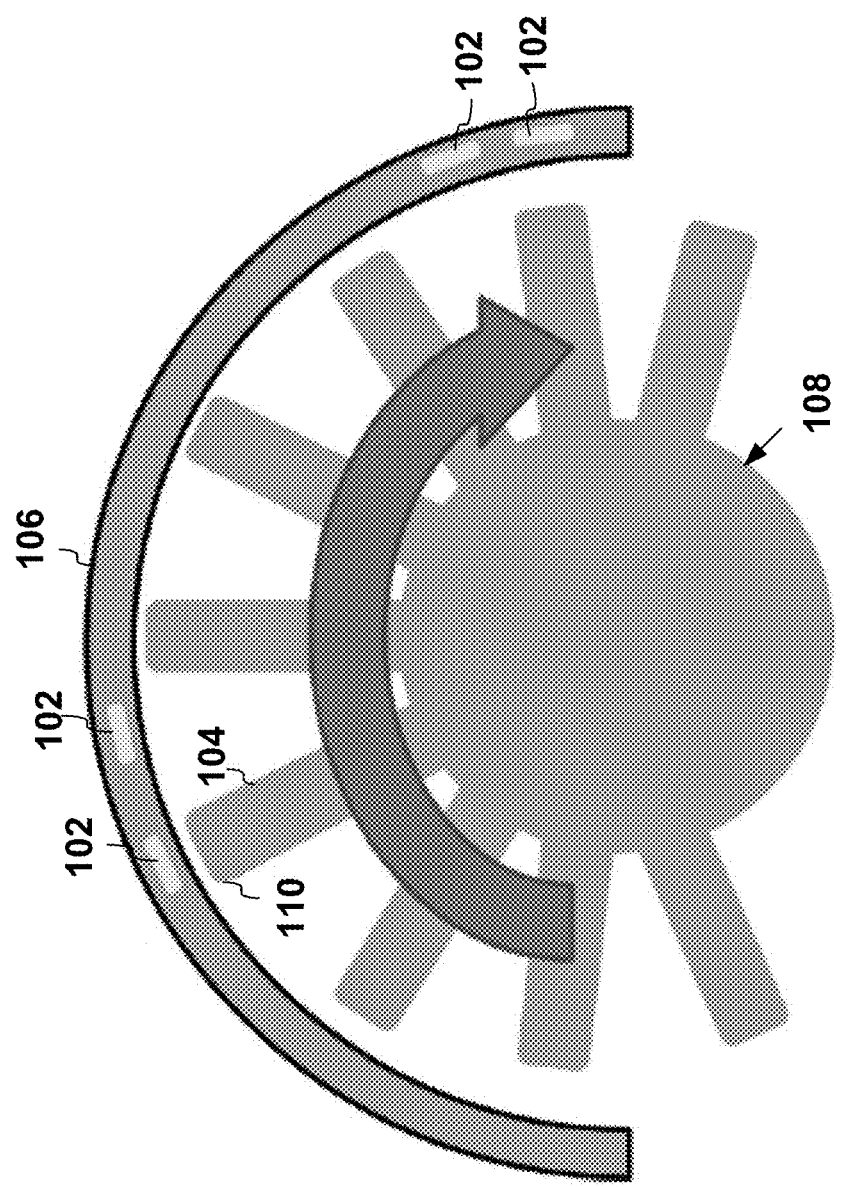
FIG. 1 is a cross-sectional view of a gas turbine engine that includes RF sensors integrated into a ceramic matrix composite engine shroud.

FIG. 1 is a cross-sectional view of a gas turbine engine that includes radio frequency (RF) sensors 102 integrated into a ceramic matrix composite (CMC) engine shroud 106. The RF sensors 102 are arranged at various locations around the CMC engine shroud 106. During operation of the gas turbine engine, blades 104 of a rotor 108 may rotate so that tips 110 of the blades 104 pass the RF sensors 102. To help improve accuracy, 3 to 4 pairs of the RF sensors 102 may be located circumferentially around the CMC engine shroud 106. Such an arrangement enables detection of engine casing deflection and, together with a tip clearance control system, enables maintaining concentricity. Maintaining concentricity may improve fuel efficiency and decrease maintenance issues.

Figure 2:
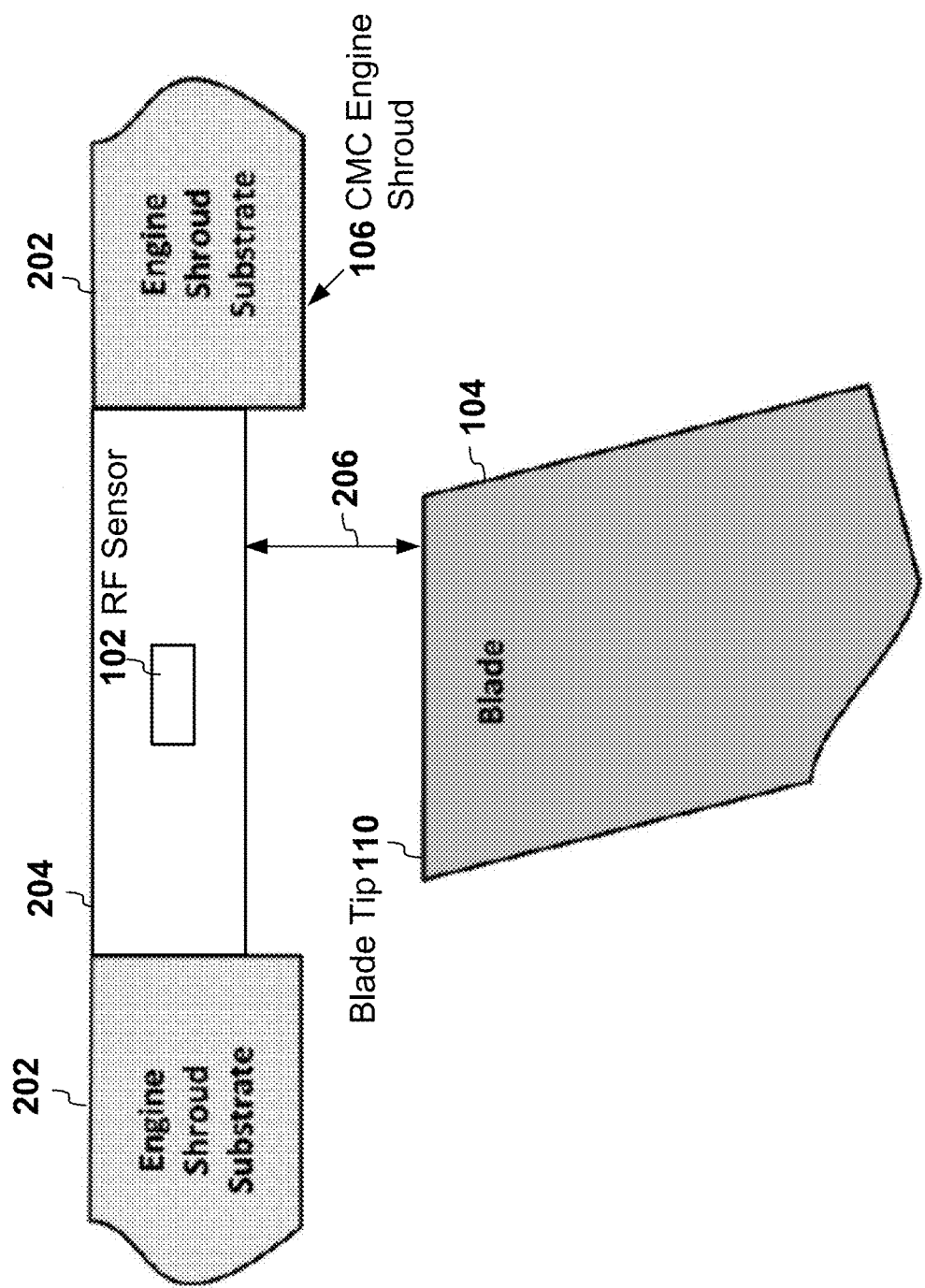
FIG. 2 is a cross-sectional view of the gas turbine engine taken in a plane parallel to the flow path.

The cross-sectional view of the gas turbine engine shown in FIG. 1 is of a cross-section taken in plane perpendicular to a flow path of a fluid that flows through the rotor 108 and past the blades 104. In contrast, FIG. 2 is a cross-sectional view of the gas turbine engine taken in a plane parallel to the flow path. In FIG. 2, the blade tip 110 of one of the blades 104 is shown in proximity to the CMC engine shroud 106 and, in particular, in proximity to one of the RF sensors 102. In the illustrated example, the CMC engine shroud 106 includes an engine shroud substrate 202 and an abradable substrate 204 located in the engine shroud substrate 202. The abradable substrate 204 is positioned radially outward from the blade tip 110 and has an exposed surface facing the blade tip 110. A distance between the blade tip 110 and the abradable substrate 204 is referred to as tip clearance 206 or blade tip clearance. One of the RF sensors 102 is shown embedded in the abradable substrate 204 in FIG. 2.

Figure 3:
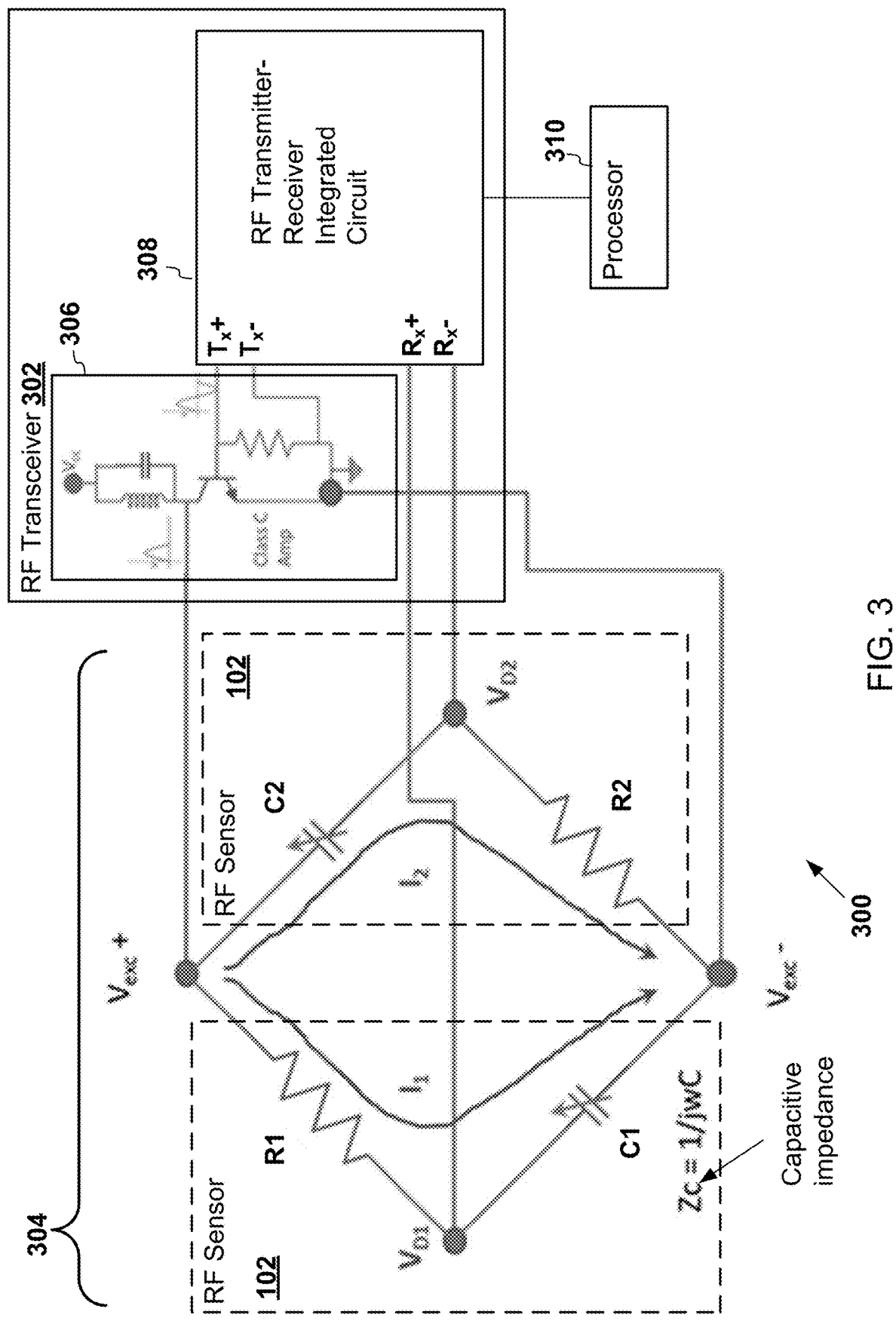
FIG. 3 illustrates a circuit diagram of a blade tip sensor.

FIG. 3 illustrates a circuit diagram of a blade tip sensor 300 or blade tip sensor system, which includes two of the RF sensors 102 arranged in a bridge-network circuit 304 and an RF transceiver 302. Although not shown in FIG. 3, the bridge-network circuit 304 is embedded in a ceramic matric composite body, such as the CMC engine shroud 106.

The RF transceiver 302 may be located in a different location than the two RF sensors 102. For example, the RF transceiver 302 may be located in a cooler location than the RF sensors 102. The RF transceiver 302 may be any device configured to generate and transmit an excitation signal to nodes $V_{exc}+$ and $V_{exc}-$ of the bridge-network circuit 304, and to receive measurement signals from nodes $V_{D1}$ and $V_{D2}$ of the bridge-network circuit 304. The excitation signal may have a predetermined frequency. The excitation signal may be sine wave, a sawtooth wave, a square wave, or any other shaped periodic signal.

In the example shown in FIG. 3, the RF transceiver 302 includes an RF transmitter-receiver integrated circuit 308

("RF transceiver IC") and a Class C Amplifier 306. The RF transceiver IC 308 is configured to generate and transmit the excitation signal over lines $T_x+$ and $T_x-$ to the bridge-network circuit 304. The excitation signal is fed through the Class C amplifier 306 to drive the bridge-network circuit 304 at a relatively high power and relatively high frequency, and to naturally modulate a carrier frequency, such as 100 MHz. In other examples, the RF transceiver IC 308 includes a built-in Class C amplifier and the Class C amplifier 306 that is discrete from the RF transceiver IC 308 is not included in the RF transceiver 302. In still other examples, the RF transceiver 302 generates and transmits a non-truncated excitation signal and no Class C amplifier is included in the RF transceiver 302. The RF transceiver IC 308 is configured to receive the measurement signals from the bridge-network circuit 304 over lines $R_x+$ and $R_x-$. The RF transceiver IC 308 may include a DAC (digital to analog converter) that converts the received measurement signals into digital signals. An example of the RF transceiver IC 308 is a product from Analog Devices called the Integrated Dual RF $T_x$, $R_x$, and Observation $R_x$, model ADRV9009. Model ADRV9009 has a relatively wide frequency range, relatively wide bandwidth as a single chip radio.

In the illustrated example, a first one of the RF sensors 102 includes a first resistor-capacitor circuit, and a second one of the RF sensors 102 includes a second resistor-capacitor circuit. The bridge-network circuit 304 includes the first resistor-capacitor circuit on a first branch and the second resistor-capacitor circuit on a second branch. The first resistor-capacitor circuit on the first branch includes a resistor R1 and a capacitor C1 connected in series. The second resistor-capacitor circuit on the second branch includes a resistor R2 and a capacitor C2 connected in series. Current 11 may flow through the first branch, and current 12 may flow through the second branch. The bridge-network circuit 304 in the illustrated example is in a half bridge configuration. The bridge-network circuit 304 may include any number of active and/or passive RF impedances.

In other words, the bridge-network circuit 304 in FIG. 3 includes two active components that act as variable capacitance sensors (C1 and C2) and two fixed resistors (R1 and R2). The relationship between dielectric permittivity ($\varepsilon$), area (A), and separation (d) associated with capacitance is described by the equation:

$$C = \frac{\varepsilon}{d} A.$$

As indicated by this equation, the value of the capacitance sensor—in other words, the effective capacitance of the capacitor C1 or C2—varies as the distance between the capacitor C1 or C2 and the blade tip 110 increases or decreases. As a result, the capacitor C1 or C2 has a capacitance that depends on a distance between the capacitor C1 or C2 and the blade tip 110. Furthermore, the capacitance of the capacitor C1 or C2 is an indicator of the size of the tip clearance 206. To improve the performance of the capacitor C1 or C2 acting as a capacitance sensor, the capacitor C1 and C2 may be screened to attenuate effects of parasitic capacitance in integration with the engine.

Based on the high temperatures in the compressor and turbine sections of the gas turbine engine, each of the RF sensors 102 may preferably include a capacitive sensor as compared to an inductive sensor. This is due to the material limitations associated with the Curie Temperatures of magnetic materials. In addition, because the blades 104 may comprise a non-metallic or a composite material, the capacitive effects may be easier to process with more accuracy. By integrating the RF sensors 102 into the engine shroud 106, the RF sensors 102 may be located strategically to capture passings of the blade 104 with a local maxima and minima of measured capacitances and to operate the bridge-network circuit 304 at a higher level of sensitivity than may be possible otherwise.

The RF transceiver 302 may operate in a 100 to 300 MHz frequency band or any other suitable frequency band. For example, the driving signal may have a frequency of 100 MHz, 120 MHz, and/or any other frequency within the operable frequency band. The fixed resistances, R1 and R2 in the RF sensors 102 may be on the order of 100 ohms. The capacitor C1 or C2 in each of the RF sensors 102 may have a capacitance in a range of 1 to 20 pF. With such configuration, the bridge-network circuit 304 may be able generate differential voltages on the order of 0.4 to 1 Volts. With this level of sensitivity, the blade tip sensor 300 may detect relatively high levels of tip clearance and tip clearances down to a fraction of 1 mm. As the tip clearance 206 gets tighter during the tip clearance control operation, the variable capacitance associated with the blade tip 110 passing increases linearly in a predictable pattern. Because of this relationship, a processor 310, such as a digital signal processor, may correlate differential output voltage vs variable capacitance of the capacitors C1 and C2, and determine the tip clearance 206 from the measured capacitance. The capacitance associated with the tip clearance variation also may provide an indication of the shape and wear of the blades 104 of the compressor or the turbine. Accordingly, the processor 310 may determine the shape and/or wear of the blades 104 and/or the tip 110 of the blades 104.

Examples of the processor 310 may include a general processor, a central processing unit, a microcontroller, an engine controller, an application specific integrated circuit (ASIC), a digital signal processor, a field programmable gate array (FPGA), a digital circuit, and/or an analog circuit. The processor 310 may be one or more devices operable to execute logic. In some examples, the logic may include computer executable instructions or computer code embodied in memory that when executed by the processor 310, cause the processor to perform the features implemented by the logic. The computer code may include instructions executable with the processor 310.

In some examples, the Class C Amplifier 306 may be compatible with a 75 MHz to 6 GHz carrier frequency of the Analog Devices ADRV9009 when the Analog Devices ADRV9009 is selected as the RF Transceiver IC 308. The Class C Amplifier 306 may also comply with power limits imposed by the Federal Communications Commission (FCC), which limit radiated emissions to a 15 to 50 milliwatt limit. Selecting 100 MHz as the carrier frequency may provide sufficient resolution of the blade tip 110 and sufficient over-sampling capability in some configurations. In some examples, the excitation signal may be injected at multiple frequencies, such as 100 and 120 MHz. Signals at the multiple frequencies may be superimposed on the same input nodes, or time division multiplexing techniques may be implemented. Any combination of frequencies for the excitation signal may be selected as long as the as the RF Transceiver IC 308 has a high enough bandwidth to accurately decode the measurement signals. Using two frequencies that are close together, such as 100 and 120 MHz, for the excitation signal may be helpful.

The processor 310 may perform signal processing on the measured signals $V_{D1}$ and $V_{D2}$. In one example, the processor 310 may include an Analog Devices Tiger-Shark 32-bit floating point Digital Signal Processing (DSP) integrated circuit.

Communication between the processor 310 and other systems (not shown) may be performed over any communications network. Examples of the communications network may include ARINC-664 (AFDX, based on Ethernet), Bosch CAN bus, ARINC-429, and/or MIL-STD-1553B. The communications may be used for reporting blade clearance, speed, wear conditions, and/or any other information. The communications standard selected may be application specific.

Figure 4:
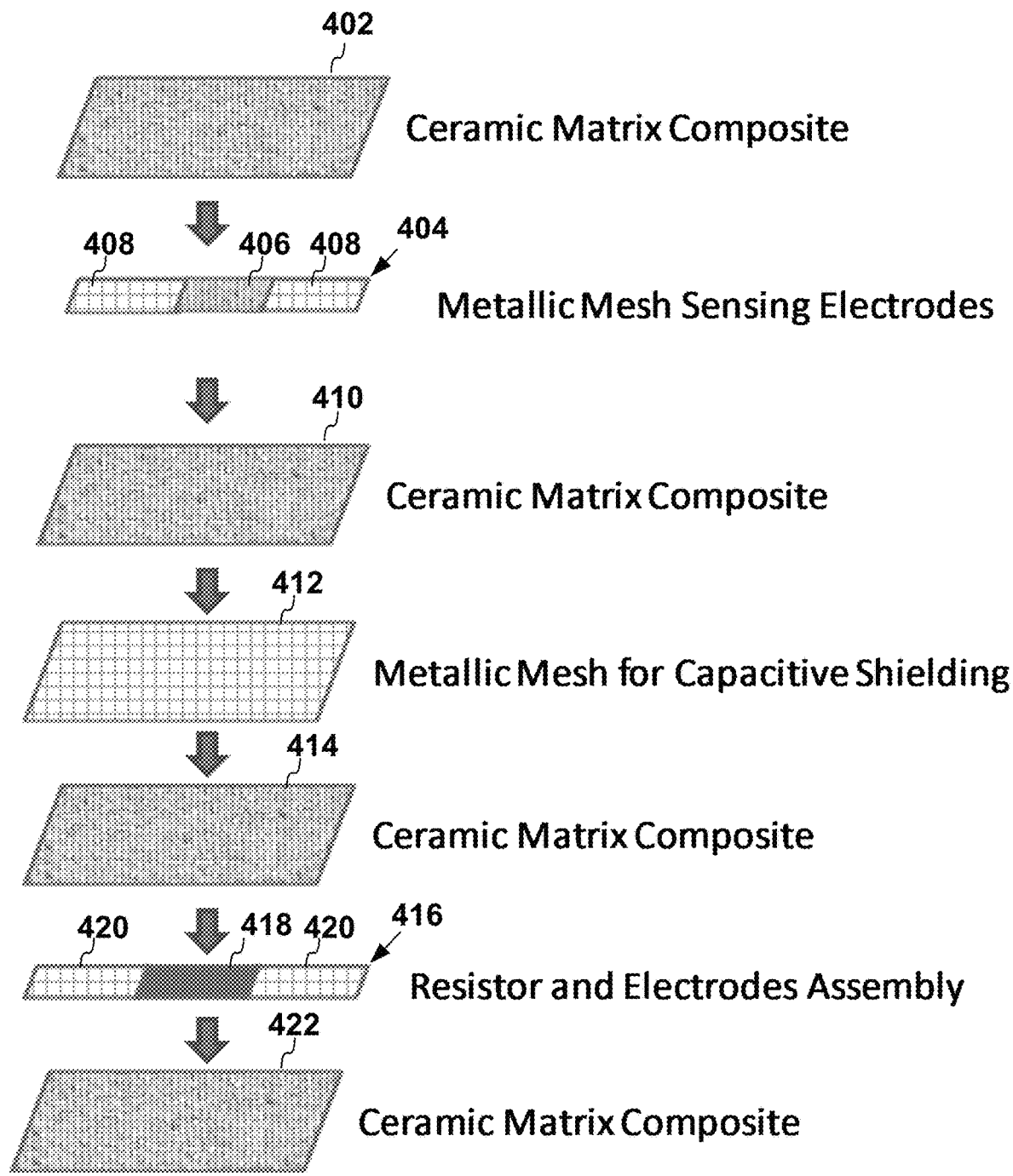
FIG. 4 illustrates an example of layers of a ceramic matrix composite body that form a RF sensor.

FIG. 4 illustrates an example of layers 402, 404, 410, 412, 414, 416, and 422 of a ceramic matrix composite (CMC) body that form one of the RF sensors 102. In the illustrated example, the CMC body includes seven layers.

CMCs comprise ceramic fibers embedded in a ceramic matrix. The matrix and fibers may comprise any ceramic material. Carbon, carbon fibers, and/or silicon carbide fibers may also be considered ceramic materials. Each of the fibers may be a bundle or a tow of ceramic tiles. The fibers in each bundle or tow may be braided or otherwise arranged. The fibers may comprise a material that is stable at temperatures above, for example, 1000 degrees Celsius. Examples of the fibers include fibers of alumina, mullite, silicon carbide, zirconia, and carbon. Examples of the ceramic matrix material include alumina, mullite, silicon carbide, zirconia, and carbon. Examples of the CMC include C/C, C/SiC, SiC/SiC, $Al_2O_3/Al_2O_3$, and Ox-Ox.

The RF sensor 102 is described herein as being integral to the CMC body and comprising layers of CMC. However, depending the conditions that the RF sensor 102 will ultimately be subjected to, the RF sensor 102 may instead be integral to and include a type of composite that includes organic material such as a carbon fiber composite. For example, the RF sensor 102 may be included in a compressor section of the gas turbine engine, which will not be subjected to temperatures as hot as the turbine section of the gas turbine engine.

A first layer 402 includes a layer of ceramic matrix composite. Ceramic matrix composites (CMCs) are a subgroup of composite materials as well as a subgroup of ceramics.

A second layer 404 includes a section 406 of CMC and a metallic mesh 408 located on opposite sides of section 406 of CMC. Because the section 406 of CMC is a CMC, the section 406 includes at least one ceramic fiber and a ceramic matrix material in which the at least one ceramic fiber is embedded. The section 406 of CMC, as well as the CMC in the first layer 402, form a dielectric of the capacitor C1 or C2 of the resistor-capacitor circuit of the RF sensor 102. The metallic mesh 408 located on opposite sides of section 406 of CMC forms electrodes of the capacitor C1 or C2. The section 406 of CMC and the CMC in the first layer 402 may have a relative permittivity (also known as dialectic constant) $\varepsilon_r$ of, for example, 3 to 5.

A third layer 410 includes a layer of ceramic matrix composite. A fourth layer 412 includes a metallic mesh for electrically shielding the capacitor C1 or C2 from the subsequent layers. A fifth layer 414 includes a layer of ceramic matrix composite.

A sixth layer 416 includes a section 418 of CMC and a metallic mesh 420 located on opposite sides of the section 418 of CMC. The section 418 of CMC includes electrically conductive fibers, such as silicon carbide fibers. The electrically conductive fibers in the section 418 of CMC form a resistive element of the resistor of the resistor-capacitor circuit of the RF sensor 102. The metallic mesh 420 forms electrodes of the resistor R1 or R2.

A seventh layer 422 includes a layer of ceramic matrix composite. The seven layers 402, 404, 410, 412, 414, 416, and 422 may be ordered as shown in FIG. 4. Alternatively, the CMC body that forms the RF sensor 102 may include fewer, additional, or different layers than illustrated in FIG. 4. The layers may be in any order suitable for the electrical elements of the RF sensor 102.

Two or more of the layers 402, 404, 410, 412, 414, 416, and 422 may be fully or partially created and then joined together. Alternatively, the layers may be formed during the formation of the CMC included in the CMC body. For example, the layers may be formed by assembling a porous ceramic preform having layers, and then forming the porous ceramic preform into the ceramic matrix composite body by melt and/or vapor infiltration. Metal components, such as the metallic meshes 408, 412, and 420, may be included in the porous ceramic preform prior to infiltration and/or added after the CMC body (or one or more portions thereof) is formed.

Figure 5:
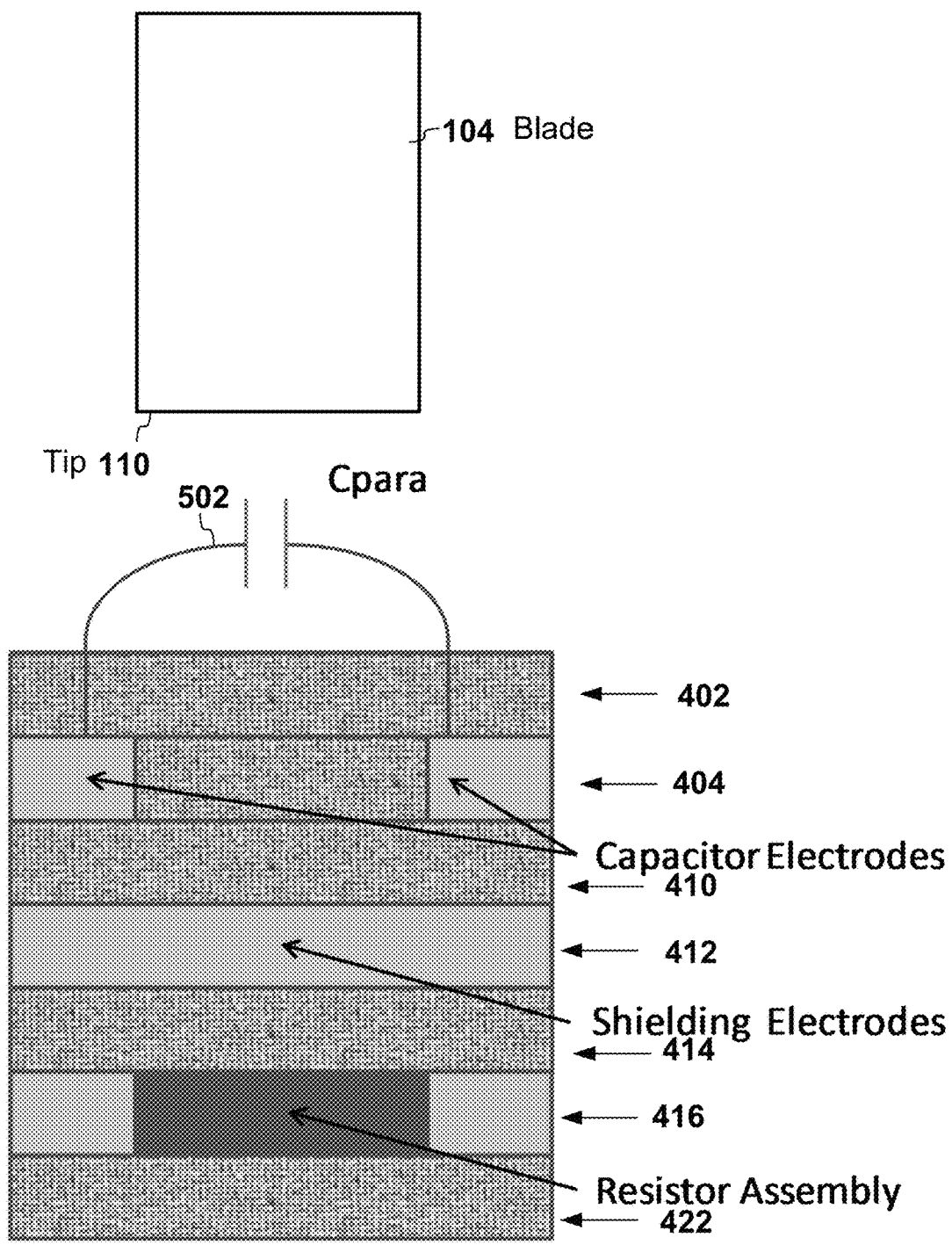
FIG. 5 is a cross-section of an example of a RF sensor.

FIG. 5 is a cross-section of an example of the RF sensor 102. The capacitor end of the RF sensor 102 faces toward the rotor so that the tip 110 of the blade 104 passes by the capacitor end of the RF sensor 102 during operation of the gas turbine engine. A schematic element 502 representing a capacitor is shown in FIG. 5 merely to illustrate that there is a capacitance between the electrodes included in the second layer 404 and that the capacitance is influenced by the blade 104.

Figure 6:
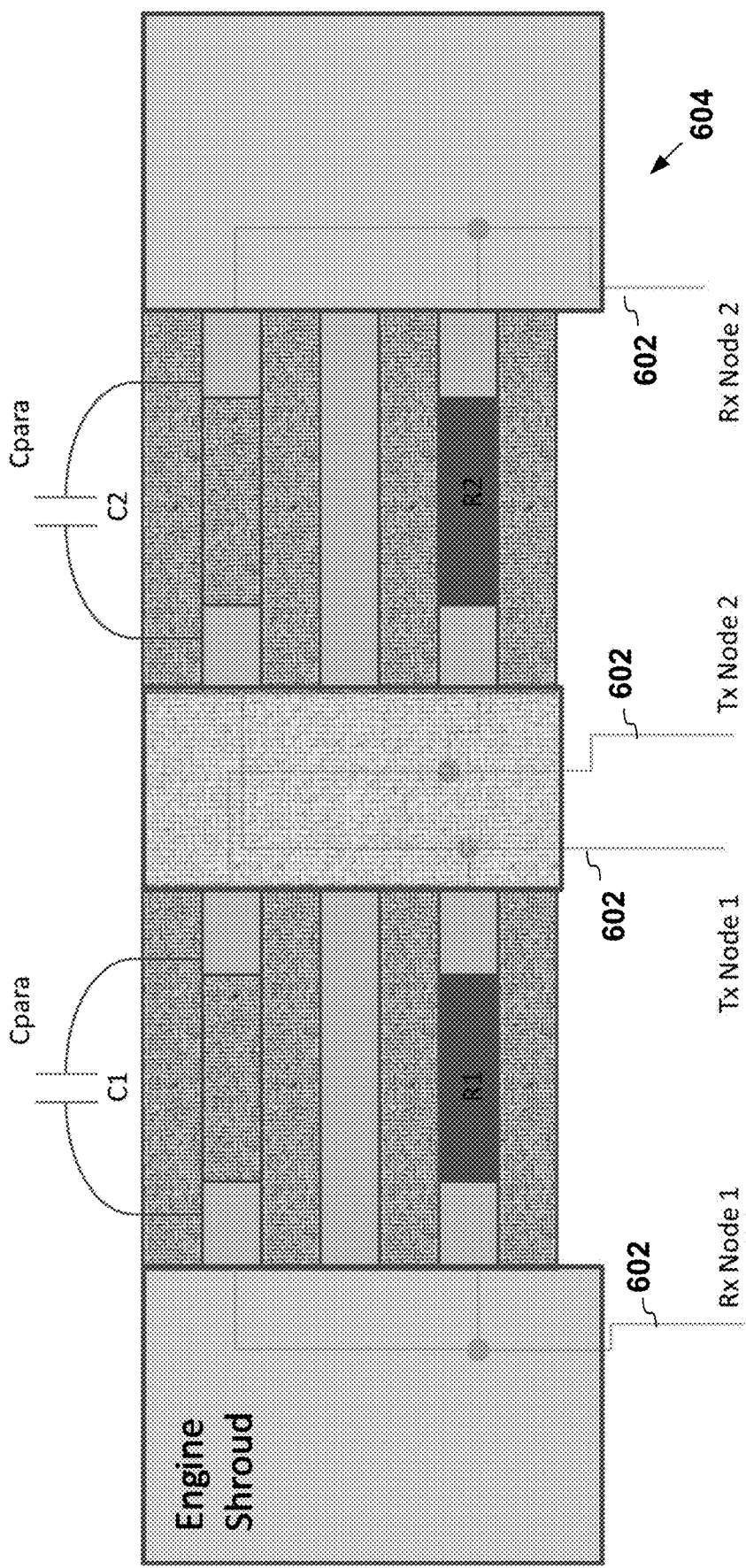
FIG. 6 illustrates a cross-section of two RF sensors that are interconnected to form a bridge-network circuit.

FIG. 6 illustrates a cross-section of two of the RF sensors 102 that are interconnected to form the bridge-network circuit 304. Electrodes 602 are machined into a CMC body 604, which is the engine shroud in the illustrated example. The electrodes 602 may couple to cabling via one or more couplers (not shown). The RF sensors 102 are integral to the CMC body 604. In other examples, the CMC body 604 may be a sensor block, which may be fastened to the engine shroud or any other component where the RF sensors 102 may sense the blades 104. The sensor block may be in the shape of a cylinder, a rectangular or square block, or any other three-dimensional shape.

Figure 7A:
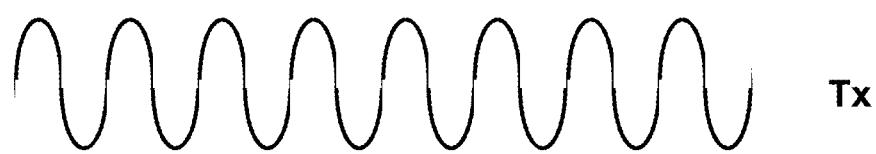
FIG. 7A illustrates the excitation signal.
Figure 7B:
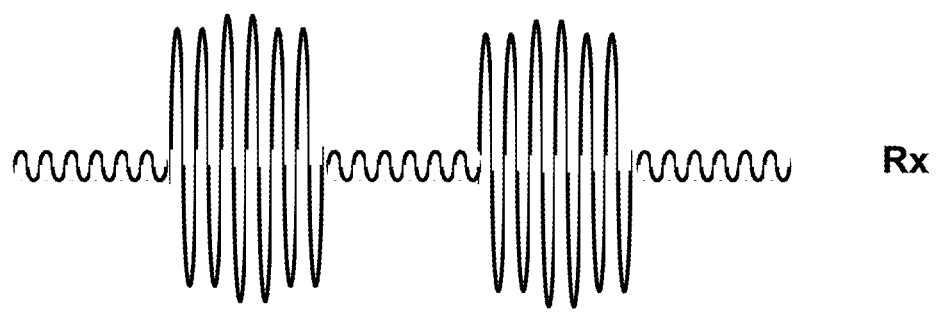
FIG. 7B illustrates a corresponding measurement signal.
Figure 7C:
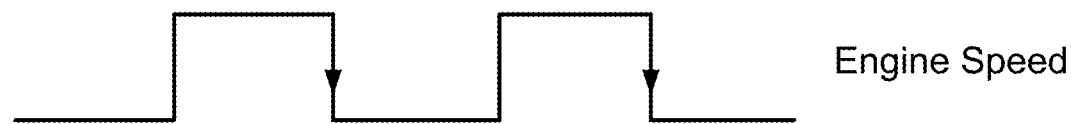
FIG. 7C illustrates a binary signal derived from the measurement signal.

FIGS. 7A-C illustrate examples of the voltage of various signals in the blade tip sensor 300 over a common time period. FIG. 7A illustrates the excitation signal.

FIG. 7B illustrates a corresponding measurement signal $R_x$ on the line $R_x+$ or $R_x-$. The voltage of the $R_x$ may increase as the blade 104 passes by the RF sensor 102. In the illustrated example, the two periods of time in which the magnitude of the $R_x$ signal substantially increases indicates that two adjacent blades 104 passed by the RF sensor 102. The largest amplitude of the measurement signal indicates a value from which the tip clearance 206 may be calculated. Alternatively or in addition, the tip clearance 206 may be calculated from an averaged value of the amplitude over a period of time or from any other value derived from the measurement signal $R_x$.

FIG. 7C illustrates a binary signal derived from the measurement signal $R_x$. The time between the trailing edges, for example, of the binary signal indicates an amount of time that passed between when the first blade 104 passed the RF sensor 102 and when the second blade 104 passed the RF sensor 102. The rotational speed of the rotor may be calculated from the amount time that passed and the angle between the two blades.

Figure 8A:
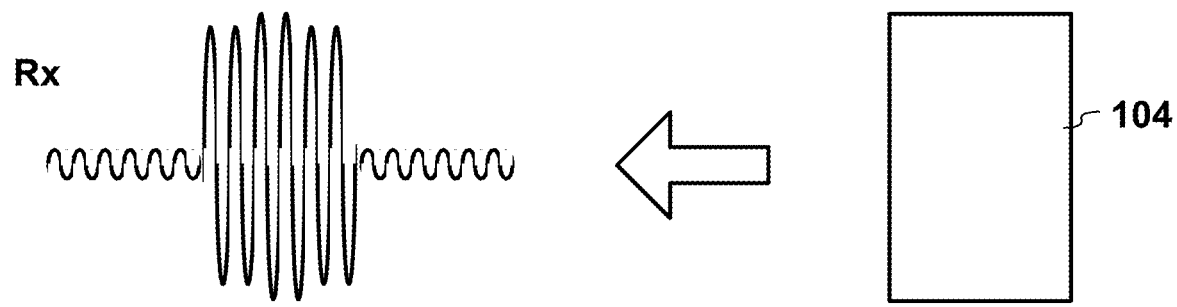
FIG. 8A illustrates an example of a shape of a measurement signal if a blade passes completely by a RF sensor and the blade is in its original shape.
Figure 8B:
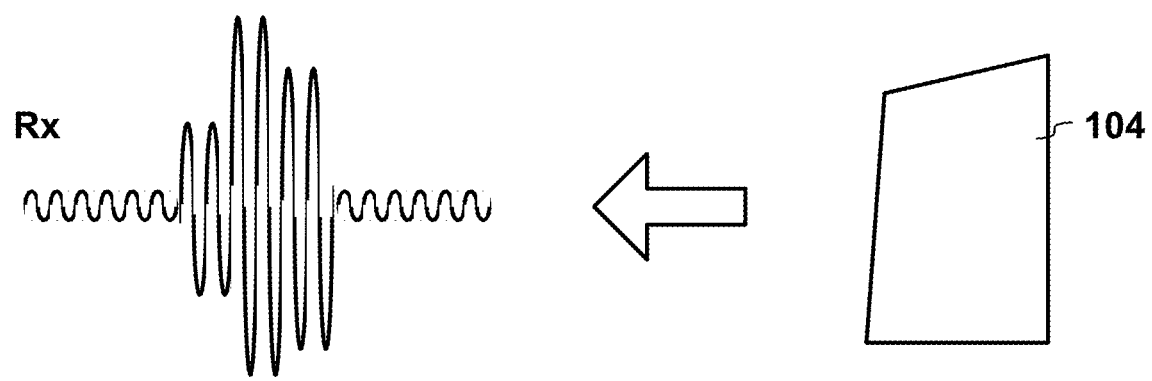
FIG. 8B illustrates an example of a shape of a measurement signal if a blade passes completely by the RF sensor and is worn.

FIGS. 8A and 8B illustrate differences in the measurement signal $R_x$ depending on how worn the blade 104 is. FIG. 8A illustrates an example of a shape of the measurement signal $R_x$ if the blade 104 passes completely by the RF sensor 102 and the blade 104 is in its original shape. In contrast, FIG. 8B illustrates an example of a shape of the measurement signal $R_x$ if the blade 104 passes completely by the RF sensor 102 and is worn. The blade 104 may be considered worn if the shape of the blade 104 is substantially different than the original shape of the blade 104 and/or if the difference in the shape of the blade 104 from the original exceeds a threshold. The processor 310 may detect the differences in the shapes by using digital signal processing techniques and/or artificial intelligence. For example, the processor 310 may use a neural network trained on past measurement signals and corresponding known wear conditions. Once trained, the neural network may predict whether the blade 104 is worn when provided the measurement signal $R_x$.

The blade tip sensor 300 may provide one or more improvements in real-time tip control. The gap between turbine blade tips and the turbine engine case is known to vary over the dissimilar temperature of the blades and the engine case. This gap allows either compressor air or turbine exhaust to "leak" past the blades with a resultant loss of energy generated by combustion. In some examples, the blade tip sensor 30 has a resolution of one millimeter and an update rate of 10 milliseconds. In other examples, the blade tip sensor 30 may have a resolution of 0.001 inches. Alternatively or in addition, the blade tip sensor 30 may have any other resolution and/or update rate.

As indicated above, the blade tip sensor 300 may detect wear in the blades or blade creep. Blade tips may leave the factory with a substantially rectangular geometry. After about 5000 hours of engine operation, the geometry may resemble a rounded butter-knife. Engine temperature, and abrasive or corrosive material in engine inlet air, may vary greatly depending on the engine operating environment and engine load. The blade tip sensor 300 may detect the loss of material from the blade tip and two centimeters inward, to a resolution of 1 percent (assuming 100 percent for a factory blade and zero percent for a missing blade). If one blade has a distinctive notch, maintenance software may identify which blade(s) have worn to the limit of a maintenance action (blade replacement). The wear can be implemented into the equipment health monitory system to indicate when maintenance is required.

Alternatively or in addition, engine speed may be measured by, for example, timing the detection of the number of blades for one shaft resolution. The processor 310 may invert the time to report frequency and Revolutions per Minute (RPM).

The use of two blade tip sensors or a combination of the blade tip sensor and a different type of rotational sensor, one at the front and one at the rear of a shaft in the gas turbine engine, enable detection of speed signal phase changes. As explained above, phase may be measured at the trailing edge of blades since less wear may be expected at the trailing edge of the blades. This phase may be linearly proportional to Torque (at stresses less than yield strength). Including temperature compensation may improve torque accuracy from 5 percent to 0.1 percent.

The blade tip sensor 300 may detect a break in the shaft of the gas turbine engine. Detecting the speed and torque may be the basis of detecting different speeds at the front and rear of a shaft. The shaft break detection may be detected within 1 to 10 milliseconds of the break with 90 percent or better confidence.

The blade tip sensor 300 may detect over-speed conditions. Detection of speeds exceeding 120 to 140 percent (with 1 percent resolution) enables fuel cut-off before the gas turbine engine self-destructs. The over-speed detection may be detected within 1 to 10 milliseconds of the over-speed condition, with a 90 percent or better confidence. The processor 310 may send a request to disable fuel delivery in response to detecting an over-speed condition.

If the RF sensors 102 are located circumferentially around the engine shroud, bearing wear may be measured as the differential blade gap opens up due to aging.

The blade tip sensor 300 may be a lower cost than more complicated electronic systems such as microwave or optical speed measurement systems. The bridge-network circuit 304 may be integrated into the engine shroud 106 due to SiC—SiC, CMC-CMC, and other high temperature materials.

The blade tip sensor 300 may eliminate and/or reduce inherent parasitic effects (capacitive and inductive) by sampling with multiple excitation frequencies. Arranging the RF sensors 102 in the bridge-network circuit 304 aids in accuracy and may provide reduced noise stability.

The gas turbine engine may take a variety of forms in various embodiments. For example, the gas turbine engine may be an axial flow engine. The gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

The gas turbine engine may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible.

Accordingly, the embodiments described herein are examples, not the only possible embodiments and implementations.

What is claimed is:

1. A tip clearance sensor comprising:
a ceramic matrix composite body comprising a plurality of ceramic fibers arranged in a plurality of layers and a matrix material in which the ceramic fibers are embedded;
a bridge-network circuit embedded in the ceramic matrix composite body, the bridge-network circuit comprising a first resistor-capacitor circuit on a first branch and a second resistor-capacitor circuit on a second branch, the first resistor-capacitor circuit and the second resistor-capacitor circuit connected in parallel, wherein each of the first and second resistor-capacitor circuits includes a respective capacitor and a respective resistor connected in series, wherein a portion of the ceramic matrix composite body in which at least one of the ceramic fibers is embedded forms a dielectric of the respective capacitor, and wherein the respective capacitor of each of the first and second resistor-capacitor circuits has a capacitance that depends on a distance between the respective capacitor and a blade of a rotor of gas turbine engine configured to pass by the ceramic matrix composite body; and
a processor configured to determine a blade tip clearance from the capacitance of the capacitors in the first and second resistor-capacitor circuits, which is derivable from a measurement signal received from the bridge-network circuit.

2. The tip clearance sensor of claim 1, wherein the ceramic matrix composite body comprises a metallic mesh separating the respective capacitor and the respective resistor of each of the first and second resistor-capacitor circuits.

3. The tip clearance sensor of claim 1, wherein a layer of the ceramic matrix composite body comprises a metallic mesh that is an electrode in at least one of the first and second resistor-capacitor circuits.

4. The tip clearance sensor of claim 1, wherein the ceramic matrix composite body includes a metallic mesh on opposite sides of a section of the ceramic fibers of one of the layers that is located between two other of the layers, wherein the metallic mesh forms electrodes of the respective capacitor, and the section of the ceramic fibers is embedded in the portion of the ceramic matrix composite body that forms dielectric of the respective capacitor.

5. The tip clearance sensor of claim 1, wherein the ceramic matrix composite body includes a metallic mesh on opposite sides of a section of electrically conductive fibers of one of the layers that is located between two other of the layers, wherein the ceramic fibers include the electrically conductive fibers, wherein the metallic mesh forms electrodes of the respective resistor of the first resistor-capacitor circuit, and wherein the electrically conductive fibers form a resistive element of the respective resistor.

6. A method to form a blade tip sensor, the method comprising:
arranging a plurality of ceramic fibers in a plurality of layers to form a porous ceramic preform; and
forming the porous ceramic preform into a ceramic matrix composite body by melt and/or vapor infiltration, wherein a bridge-network circuit is embedded in the ceramic matrix composite body, the bridge-network circuit comprises a first resistor-capacitor circuit on a first branch and a second resistor-capacitor circuit on a second branch, wherein each of the first and second resistor-capacitor circuits includes a respective capacitor and a respective resistor connected in series, and, a portion of the ceramic matrix composite body in which at least one ceramic fiber is embedded forms a dielectric of the respective capacitor, and wherein the respective capacitor of each of the first and second resistor-capacitor circuits has a capacitance that depends on a distance between the respective capacitor and a blade of a rotor of gas turbine engine.

7. The method of claim 6 further comprising a metallic mesh for electromagnetic shielding in the porous ceramic preform before forming the porous ceramic preform into a ceramic matrix composite body.

8. The method of claim 6 further comprising including a metallic mesh for an electrode in the porous ceramic preform before forming the porous ceramic preform into the ceramic matrix composite body.

9. The method of claim 6 further comprising including a metallic mesh on opposite sides of a section of the ceramic fibers of one of the layers that is located between two other of the layers, wherein after forming the porous ceramic preform into the ceramic matrix composite body, the metallic mesh forms electrodes of the capacitor.

10. The method of claim 6 further comprising adding a metallic mesh on opposite sides of a section of electrically conductive fibers of one of the layers that is located between two other of the layers, wherein after forming the porous ceramic preform into the ceramic matrix composite body, the metallic mesh forms electrodes of the respective resistor in the first resistor-capacitor circuit or the second resistor-capacitor circuit, the electrically conductive fibers form a resistive element of the respective resistor, and the ceramic fibers include the electrically conductive fibers.

11. The method of claim 10, wherein the electrically conductive fibers comprise silicon carbide fibers.

12. The method of claim 6, wherein the ceramic matrix composite body comprises a section of an engine shroud.

13. The tip clearance sensor of claim 1 further comprising a transceiver configured to generate and transmit an excitation signal at a plurality of frequencies to the bridge-network circuit.

14. The tip clearance sensor of claim 1, wherein the processor is configured to detect wear on the blade from a measurement signal received from the bridge-network circuit.

15. The tip clearance sensor of claim 1, wherein the processor is configured to determine engine speed from a measurement signal received from the bridge-network circuit.

16. The tip clearance sensor of claim 1, wherein the processor is configured to detect shaft break based on a measurement signal received from the bridge-network circuit.

* * * * *